Oct. 23, 1962
E. W. SCHOEFFEL
3,060,118
SEWAGE TREATMENT
Filed May 16, 1958
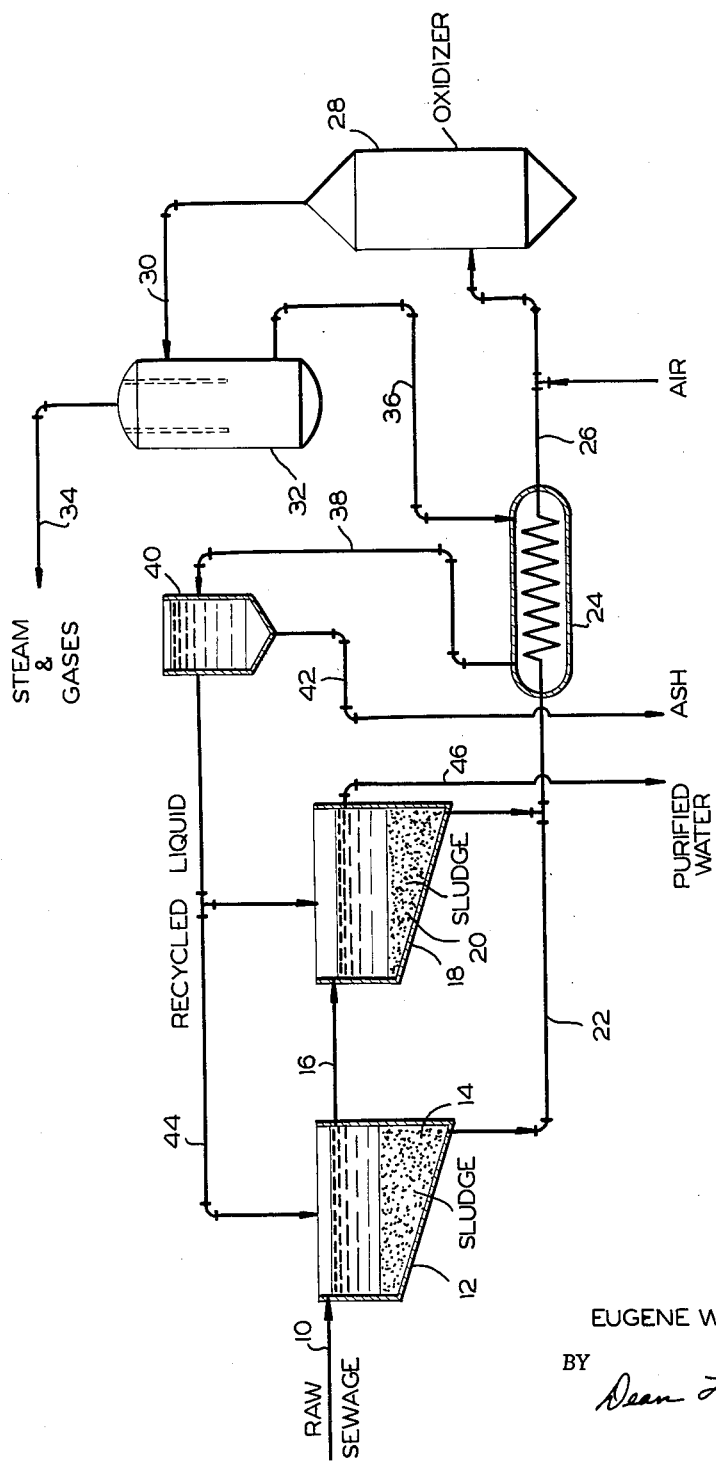
INVENTOR.
EUGENE W. SCHOEFFEL
BY
Dean Laurence
ATTORNEY

United States Patent Office 3,060,118
Patented Oct. 23, 1962

3,060,118
SEWAGE TREATMENT
Eugene W. Schoeffel, Kronenwetter, Wis., assignor to Sterling Drug Inc., New York, N.Y., a corporation of Delaware
Filed May 16, 1958, Ser. No. 735,766
5 Claims. (Cl. 210—3)

The present invention relates to sewage treatment. More particularly, this invention relates to a process for treating sewage sludge to obtain innocuous, readily- disposable end products.

City or communal sewage contains great quantities of water with various organic and inorganic materials dissolved and dispersed in the water. Many of the materials in the sewage readily combine with oxygen so that rivers and streams into which raw sewage is passed are deprived of oxygen necessary for fish and plant life. Thus, where excessive amounts of raw sewage are passed into streams, the plants and fish die. Further, there are many disease causing germs and bacteria in the sewage which render the streams dangerous to humans. Thus, the lakes and streams receiving the sewage are rendered unsafe for swimming or boating. Putrefaction of many of the organic materials in the sewage occurs and foul gases bubble out of the lakes and streams to fill the air with obnoxious stench. The steadily growing population portends an aggravation of the problem as more and more people are crowded into the same living space.

Numerous attempts have been made to treat the sewage to remove the obnoxious materials therefrom and discharge a harmless aqueous mixture into a convenient stream or lake.

In the past, the sewage has been passed into settling tanks where efforts are made to precipitate the solid materials as a sludge, so that the sludge can be separated from the remaining solution. In primary treatment, sewage is generally passed into settling tanks and then to digesters maintained free of air where the sludge is thickened with the aid of anaerobic bacteria. Secondary or activated sludge is generally obtained by running the primary treatment effluent through settling tanks and forcing air in through porous plates at the bottom of the tanks. The action of bacteria in the sewage causes the solid organic matter to coagulate and settle. The settled sludge may be filtered and dried. The dried sludge, containing organic materials, has been sold as fertilizer. Alternatively, sludge has been incinerated by the use of special equipment.

Sewage contains organic material that is measured by established factors. The biochemical oxygen demand, hereinafter referred to as B.O.D., of sewage is the amount of oxygen required to maintain aerobic conditions during decomposition and is generally reported as the oxygen utilized by biological action when a sample of the material is incubated for five days at 20 degrees centigrade. The chemical oxygen demand, hereinafter referred to as C.O.D., is ascertained by tests involving the chemical digestion of a sample with an oxidizing agent such as potassium dichromate.

The invention resides in the concept of removing substantially all organic solids from sewage by a process for treating sewage comprising settling sludge from sewage; separating the sludge from the supernatant liquid; subjecting the sewage sludge to wet air oxidation under pressure and elevated temperature to oxidize from 60 to 85 percent of the oxidizable material and thus remove between about 60 and about 85 percent of the chemical oxygen demand of the sludge, thereby removing or destroying substantially all of the organic solids; evaporating a substantial portion of the water and separating the materials into a gas phase, an aqueous liquid phase and a substantially inorganic solid ash phase; recycling or recirculating the aqueous liquid phase, containing an increased chemical oxygen demand and an increased biological oxygen demand due to a concentration of remaining organic materials in the liquid phase, to the sludge settling steps. The recycled aqueous liquid portion contains a B.O.D. of between about 1500 and 15,000 parts per million and acts as a nutrient for the micro-organisms in the sewage in the settling tanks.

Throughout the specification and claims, the term "percent" means percent by weight and "p.s.i.g." means pounds per square inch gauge.

In the process of the invention, sewage is passed into settling tanks and a sludge settles to the bottom. The settling of the sludge may be produced by various processes including the addition of chemical precipitants, the action of aerobic bacteria in the activated sludge process, or the action of anaerobic bacteria in a sludge digester process. The sludge can be drawn from the bottom of the settling tanks and passed through one side of a heat exchanger while the liquid resulting from previous wet-air oxidation of sludge is passed through the other side of the heat exchanger. Thus, the sludge is preheated to a temperature at which the oxidation is initiated. Thereafter the heated sludge is passed to a wet-air oxidizer where it is contacted with oxygen-containing gas such as air at a temperature of 338 degrees Fahrenheit to 608 degrees Fahrenheit and pressures ranging from 300 p.s.i.g. to 3000 p.s.i.g. for periods from 3 seconds to 30 minutes.

The conditions of treatment in the wet air oxidizer are selected so that 60 to 85 percent by weight of the combustible material is oxidized to end products such as carbon dioxide and water. It has been found that within the range of 60 to 85 percent by weight oxidation of combustible materials, a suitable effluent is produced having an insoluble residue containing less than 15 percent organic solids, hereinafter denominated ash. The effluent consists of a liquid phase of water containing some dissolved materials, a water insoluble ash that is almost entirely inorganic but contains a small amount of water insoluble combustible matter. The water insoluble ash settles to the bottom. After leaving the wet-air oxidizer, the mixture is passed to a separator where steam and gases formed in the oxidation step are separated from the liquid and ash. Then the liquid and ash mixture can be passed through the heat exchanger to preheat the sludge passing to the wet air oxidizer. Next the mixture is passed to a solid-liquid separator where the ash, containing less than 15 percent by weight of combustible materials, is separated from the liquid. The separated liquid contains soluble combustible materials and has a biological oxygen demand of between about 1500 parts per million and 15,000 parts per million. This warm liquid enriched in biological oxygen demand by the concentration effected by removal of steam, gases and ash, is recycled to one or more of the sewage treatment tanks.

The recycling of the liquid from the wet-air oxidizer according to the invention initiates and accelerates the biolysis and bacterial actions to cause an improved settling of the sludge.

Further, when heavy rains cause dilution of the sewage, the settling of the sludge in the settling tanks fails to occur or occurs too slowly. According to the process of the invention, the recycled liquid, rich in organic material, provides nutrient upon which the bacteria can feed and multiply. Thus, the reactions causing settling are improved and accelerated by the recycled liquid.

A plurality of treatment stages can be employed with a plurality of treatment tanks. The sludges from all tanks can be combined and passed to a single wet-air oxidizer. Alternatively, a plurality of wet-air oxidizers can be provided, one for the sludge of each treatment tank.

Thus, it is a primary object of the invention to provide a process for oxidizing sewage sludge with wet air to produce an enriched liquid effluent and a solid residue of predominantly water insoluble ash containing not more than 15 percent combustible material.

It is a further object of the invention to provide a process for treating sewage wherein sludge is settled, the sludge is wet air oxidized under conditions where 60 to 85 percent of the combustible material in the sludge is oxidized to produce a liquid having enriched biological oxygen demand and a water insoluble ash predominantly inorganic in nature (in excess of 85 percent inorganic) and the liquid is recycled to the sludge settling tanks.

It is a further object of the invention to provide a process for sewage treatment that produces a water insoluble ash predominantly of inorganic nature and a water portion that is innocuous.

Other objects and advantages of the invention will become apparent upon reference to the following detailed specification and appended drawing:

In the physical embodiment of the invention diagrammed in the drawing, raw sewage from city or communal sewage systems (normally having a B.O.D. of 200-300 p.p.m.) passes through a line 10 into a primary settling tank 12. There a sludge 14 settles out at the bottom of tank 12. The supernatant liquid passes through line 16 to a secondary treatment tank 18 where further formation of sludge 20 occurs. The sludges 14 and 20 pass through line 22 to a heat exchanger 24 where the sludge is preheated. Thereafter the sludge passes through line 26 and is mixed with an oxygen-containing gas such as air. The mixture of sludge and air passes into wet-air oxidizer 28 where the oxidizable materials are oxidized in aqueous dispersion carried out as flameless combustion. The oxidation occurs while the oxidizable materials are dispersed in liquid water. The sludge entering oxidizer 28 contains about 2 percent to 12 percent solids. The reaction conditions are within the following ranges: temperature from 338 degrees Fahrenheit to 608 degrees Fahrenheit, pressures from 300 p.s.i.g. to 3000 p.s.i.g. The sludge is held in oxidizer 28 for a holding time of 3 seconds to 30 minutes. The reaction conditions including the air supplied are selected so that 60 to 85 percent of the oxidizable materials are oxidized in reactor 28.

Effluent from reactor 28 passes through line 30 to liquid-gas separator 32. Steam, some volatile combustibles and gases exit from the separator 32 by line 34. Liquid and solids pass through line 36, to heat exchanger 24 where heat is transferred to sludge passing toward the oxidizer 28. The liquid and solid mixture then passes through line 38 to liquid-solid separator 40. Solid ash in the form of an aqueous slurry leaves the bottom of separator 40 through line 42 to convenient disposal. The ash is innocuous and inoffensive containing at least 85 percent non-volatile inorganic material and not more than 15 percent combustible material.

Liquid from separator 40 passes to the settling tanks 12 and 18 via line 44. The liquid is an aqueous mixture containing dissolved organic matter and having an enriched B.O.D. of from 1500 to 15,000 p.p.m. This liquid mixture provides substance upon which the bacteria in the treatment tanks can feed.

From the last treatment tank 18, effluent of water flows through line 46. The water usually contains not more than 25 parts per million of B.O.D.

In the process of the invention, the chemical oxidation of about 60 to about 85 percent of the sludge is critical to produce the result of the invention because if there is less than 60 percent oxidation, the separation of the effluent from the oxidizer into a liquid portion and water insoluble matter is difficult and time-consuming and the water insoluble matter will contain excessive amounts of obnoxious combustible material. On the other hand, if there is more than 85 percent oxidation, the oxidizer conditions must be so rigidly controlled as to burden unnecessarily the technical and economic operation of the process.

Following is a specific example of sewage treatment according to the embodiment illustrated in FIGURE 1:

Flow 115,000,000 gallons of raw sewage containing a biochemical oxygen demand of 200 parts per million into the settling tank 12. The sewage weight is 8.34 pounds per gallon. Hence the total weight is 960,000,000 pounds of sewage containing 192,000 pounds of B.O.D.

In the primary treatment 50 tons (dry weight) of sludge will be settled, removing one third (64,000 lbs.) of the B.O.D. This primary sludge containing the 50 tons of solids will be oxidized by the process as a 6 percent sludge. The weight of this sludge (wet basis) will be 1,667,000 pounds. In the oxidation, 417,000 pounds of water will evaporate as usable steam leaving a residue of 1,250,000 pounds of water and ash. The ash (dry basis) which is 15 tons (30 percent) can readily be settled in a separator leaving a maximum of 1,220,000 pounds of water, with a B.O.D. of between 3000 and 6000 pounds. The volume of this effluent water is only 146,000 gallons, which can be combined with the 115,000,000 gallons of treated supernatant aqueous effluent passing from a settling tank such as 12 via line 16 and containing 128,000 pounds of B.O.D.

If the primary effluent passing from tank 12 via line 16 is given further treatment in tank 18, an additional 50 tons (dry basis) of activated sludge are produced. The primary and activated sludges would be combined and this mixture would then be run through the oxidizer as 3,334,000 pounds of 6 percent sludge having a volume of 392,000 gallons. The results would be the same as detailed in the previous paragraph except that due to the quantity being doubled, the effluent, ash B.O.D., et cetera would also be doubled. The residual water, amounting to 292,000 gallons and containing a total of only 6000 to 12,000 pounds of B.O.D., can be returned as via line 44 to the aeration unit tanks 12 and 18 of the activated treatment plants and would increase the load of these tanks only from 5 percent to 10 percent.

More specific data are given in the following table of runs made with the aforedescribed process.

| Run No. | Duration of oxidation in hours for sampling purposes | Sludge volume in gallons | Type of sludge | C.O.D. grams per liter of sludge | Heat value of sludge in B.t.u. per gallon | Air used in lbs. per gal. of sludge | Reaction temperature in °F | Extent of oxidation of sludge in percent | C.O.D. left in residual water in percent | C.O.D. left in residual solids in percent | C.O.D. in effluent water in grams per liter | C.O.D. in effluent solids in grams per liter | Ash of effluent solids in percent | Solid organic matter removed in percent | B.O.D. of effluent water in p.p.m. |
|---|---|---|---|---|---|---|---|---|---|---|---|---|---|---|---|
| 1 and 2 | 23.75 | 5,938 | Activated | 28–34 | | 1.23 | 470 | 72–82 | 18–28 | | 6.3 | | 85.3 | 90.0 | |
| 3 | 10.33 | 2,655 | ----do---- | 36.1 | | 1.105 | 497 | 77 | 18 | 5 | 6.6 | 1.7 | 89.4 | 94.5 | |
| 4 | 8 | 1,825 | 50 percent primary, 50 percent activated | 60.1 | 3,190 | 2.08 | 514 | 84.2 | 12.2 | 3.6 | 7.3 | 2.2 | | | |
| 5 | 30 | 6,855 | ----do---- | 42.8 | 2,145 | 1.30 | 515 | 78.7 | 18.4 | 2.9 | 7.9 | 1.2 | 87.7 | 92.1 | 5,270 |
| 6 | 13 | 2,740 | Primary | 67.1 | 3,290 | 2.20 | 515 | 83.6 | 13.7 | 2.7 | 9.2 | 1.8 | 87.0 | 94.3 | 4,630 |
| 7 | 17 | 4,034 | Activated | 40.6 | 1,785 | 1.15 | 487 | 78.3 | 17.3 | 4.4 | 7.0 | 1.8 | 88.4 | 92.0 | 3,930 |
| 8 | 137 | 32,709 | 60 percent primary, 40 percent activated | 63.7 | 3,140 | 2.15 | 511 | 79.6 | 15.5 | 4.9 | 9.9 | 3.2 | 84.1 | 91.8 | 5,420 |
| 9 | 58 | 11,664 | Primary | 83.2 | 3,940 | 2.40 | 518 | 77.2 | 18.7 | 4.1 | 15.6 | 3.4 | 90.4 | 95.6 | 8,890 |
| 10 | 255.5 | 56,422 | 50 percent primary 50 percent activated | 65.7 | 3,078 | 2.0 | 500 | 76.0 | 16.9 | 7.1 | 11.1 | 4.4 | 86.0 | 93.1 | 6,850 |
| 11 | 19 | 4,465 | ----do---- | 84.7 | 3,945 | 2.6 | 521 | 79.2 | 13.5 | 7.3 | 11.5 | 6.1 | 86.3 | 94.1 | 7,320 |
| 12 | 58 | 13,910 | ----do---- | 96.3 | 4,490 | 3.0 | 519 | 81.7 | 12.9 | 5.4 | 12.4 | 5.2 | 86.8 | 93.9 | 6,590 |

While the invention has been illustrated with physical embodiments, these are exemplary only and the scope of the invention is limited only by the subjoined claims.

I claim:

1. In a sewage treatment process, the steps of: biologically treating aqueous sewage to settle sludge therefrom; chemically oxidizing from 60 to 85 percent of the oxidizable matter of said sludge to carbon dioxide and water thereby solubilizing substantially all of the organic solids present in said sludge; evaporating a substantial portion of the water from the oxidation product; separating the water insoluble matter, primarily inorganic in character, from the partially evaporated oxidation product to leave a residual aqueous liquid phase containing the solubilized organic matter concentrated therein; and, returning said aqueous liquid phase to said biological treatment step to serve as a nutrient for the micro-organisms therein.

2. In a sewage treatment process, the steps of: biologically oxidizing aqueous sewage in a settling zone containing micro-organisms to form a sludge at the bottom of the settling zone; oxidizing said sludge with oxygen-containing gas in a chemical oxidation zone until from about 60 to 85 percent of the oxidizable matter of said sludge has been oxidized to carbon dioxide and water thereby solubilizing substantially all of the organic solids present in said sludge; withdrawing the effluent from said chemical oxidation zone; separating the gases from said effluent; separating the solid material from said effluent to leave an aqueous liquid having a high biological oxygen demand; and, recycling the said aqueous liquid to said settling zone to serve as a nutrient for the micro-organisms therein.

3. In a sewage treatment process, the steps of: biologically treating sewage to settle sludge therefrom; separating the watery sludge derived from said biological treatment step into gaseous, solid and liquid phases by wet-air chemical oxidation of said sludge sufficient to oxidize from 60 percent to 85 percent of the oxidizable material contained in the sludge to carbon dioxide and water thereby solubilizing substantially all of the organic solids present in said sludge; said gaseous phase comprising steam and products of combustion resulting from said oxidation, said solid phase comprising water insoluble components of said oxidized sludge, primarily inorganic in character, and said liquid phase comprising the remaining water and water soluble material left in said oxidized sludge, the unoxidized organic material therein being in substantially higher concentration than that of the sewage being treated; and, recycling said concentrated liquid phase to said biological treatment step to serve as a nutrient for the micro-organisms therein.

4. In a sewage treatment process, the steps of: biologically oxidizing sewage in a settling zone containing micro-organisms to form a sludge at the bottom of said settling zone; oxidizing the said sludge with oxygen-containing gas in a chemical oxidation zone at a temperature between about 338 degrees Fahrenheit and about 608 degrees Fahrenheit and a pressure between about 300 p.s.i.g. and 3000 p.s.i.g. until about 60 to about 85 percent of the oxidizable material in said sludge is oxidized to carbon dioxide and water thereby solubilizing substantially all of the organic solids present in said sludge; withdrawing the effluent from said chemical oxidation zone; venting the gases from said effluent; separating the solid material from said effluent to leave an aqueous liquid having a biological oxygen demand of between about 1500 and about 15,000 parts per million; and, recycling said aqueous liquid back to said biological oxidation and settling zone to serve as a nutrient for the micro-organisms therein.

5. In a sewage treatment process, the steps of: biologically oxidizing sewage in a settling zone containing micro-organisms to form a sludge at the bottom of said settling zone; passing said sludge from said settling zone through one side of a heat exchanger and into a chemical oxidation zone; oxidizing said sludge with oxygen containing gas in said chemical oxidation zone at a temperature between about 338 degrees Fahrenheit and about 608 degrees Fahrenheit and a pressure between about 300 p.s.i.g. and about 3000 p.s.i.g. until from about 60 to about 85 percent of the oxidizable material in said sludge is oxidized to carbon dioxide and water thereby solubilizing substantially all of the organic solids present in said sludge; withdrawing the effluent from said chemical oxidation zone; venting the gases from said effluent to leave a mixture of solids and liquid; passing said mixture of solids and liquid through the other side of said heat exchanger; separating the solids from said mixture to leave an aqueous liquid having a biological oxygen demand of between about 1500 and 15,000 parts per million; and, recycling said aqueous liquid back to said biological oxidation and settling zone to serve as a nutrient for the micro-organisms therein.

References Cited in the file of this patent

UNITED STATES PATENTS

| | | |
|---|---|---|
| 1,967,197 | Besselievre | July 17, 1934 |
| 2,075,224 | Porteous | Mar. 30, 1937 |
| 2,360,811 | Kelly et al. | Oct. 17, 1944 |
| 2,850,449 | Torpey | Sept. 2, 1958 |
| 2,903,425 | Zimmermann | Sept. 8, 1959 |

OTHER REFERENCES

"Heat Treatment as an Aid to Sludge Dewatering," Lumb Abstract in Sewage and Industrial Wastes, vol. 25, September 1953, page 1126.

"Oxidation and Stabilization of Sewage Sludges With Oxygen at Elevated Temperatures and Pressures," Abel et al., Sewage and Industrial Wastes, vol. 26, December 1954, pages 1450–1452.